United States Patent
Ramesh

(10) Patent No.: US 7,848,460 B2
(45) Date of Patent: Dec. 7, 2010

(54) INTERFERENCE SUPPRESSION METHOD AND APPARATUS

(75) Inventor: Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 726 days.

(21) Appl. No.: 11/776,704

(22) Filed: Jul. 12, 2007

(65) Prior Publication Data

US 2009/0016465 A1    Jan. 15, 2009

(51) Int. Cl.
H04L 27/00 (2006.01)

(52) U.S. Cl. .............. 375/324; 375/329; 375/346; 375/350; 375/E1.017

(58) Field of Classification Search ............ 375/324, 375/329, 346, 350, 322, 316, 315, 345, E1.017; 455/63.1, 296; 329/318, 320; 348/21, 607
See application file for complete search history.

(56) References Cited

U.S. PATENT DOCUMENTS

| | | | |
|---|---|---|---|
| 6,711,218 | B2 | 3/2004 | Dent |
| 7,133,476 | B2 | 11/2006 | Arslan et al. |
| 7,215,726 | B2 | 5/2007 | Meyer et al. |
| 2004/0014424 | A1 * | 1/2004 | Kristensson et al. ....... 455/63.1 |
| 2004/0028155 | A1 * | 2/2004 | Dornstetter et al. ......... 375/343 |
| 2005/0226344 | A1 | 10/2005 | Kuchi et al. |
| 2005/0254600 | A1 | 11/2005 | Chen et al. |
| 2006/0203943 | A1 | 9/2006 | Scheim et al. |

FOREIGN PATENT DOCUMENTS

| | | | |
|---|---|---|---|
| EP | 1107530 A1 * | 6/2001 | |
| EP | 1569399 A1 | 8/2005 | |
| WO | 02/054660 | 7/2002 | |

OTHER PUBLICATIONS

Hafeez, A. et al. "Interference Cancellation for EDGE via Two-User Joint Demodulation." 2003 IEEE 58th Vehicular Technology Conference (VTC 2003-Fall). Oct. 6-9, 2003, vol. 2, pp. 1025-1029.

(Continued)

Primary Examiner—Shuwang Liu
Assistant Examiner—Helene Tayong
(74) Attorney, Agent, or Firm—Coats & Bennett, P.L.L.C.

(57) ABSTRACT

A composite baseband signal includes a desired signal component modulated according to a first modulation scheme and an interfering signal component modulated according to a second modulation scheme. Information is recovered from the composite signal by applying a phase rotation associated with the second modulation scheme to the composite signal to generate a rotated signal. Based on the rotated signal, a channel model associated with the desired signal component and interference cancelling filter coefficients associated with the interfering signal component are generated. The rotated signal is filtered according to the interference cancelling filter coefficients to suppress the interfering signal component from the rotated signal. The filtered signal is equalized based on branch metrics derived from the channel model and symbol hypotheses rotated in accordance with a difference in phase rotations associated with the first and second modulations to recover information from the desired signal component.

16 Claims, 3 Drawing Sheets

OTHER PUBLICATIONS

Wilhelm, H. "Whitened Matched Filter for Attenuating Frequency Selectively Faded Interferers in GSM." 2005 IEEE Wireless Communications and Networking Conference, Mar. 13-17, 2007, vol. 1, pp. 346-352.

Meyer, Raimund et al. "A Single Antenna Interference Cancellation Algorithm for GSM." 2005 IEEE 61st Vehicular Technology Conference. May 30-Jun. 1, 2005, vol. 2, pp. 821-825. ISSN: 1550/2252. ISBN: 0-7803-8887-9.

Meyer, Raimund et al. "A Single Antenna Interference Cancellation Algorithm for increased GSM Capacity." IEEE Transactions on Wireless Communications. Jul. 2006, vol. 5, No. 7, pp. 1616-1621.

Mostafa, Ayman A. "Single Antenna Interference Cancellation (SAIC) Method in GSM Network." 2004 IEEE 60th Vehicular Technology Conference. Sep. 26-29, 2004, vol. 5, pp. 3748-3752. ISSN: 1090-3038. ISBN: 0-7803-8521-7.

* cited by examiner

INTERFERENCE SUPPRESSION METHOD AND APPARATUS

BACKGROUND

The present invention generally relates to interference suppression, and particularly relates to demodulating a desired signal while suppressing an interfering signal having a different modulation.

Some wireless communication systems employ several modulation schemes for transmitting information. The modulation scheme used to communicate information over a particular channel depends on several factors such as the degree of channel interference and noise. Generally, a higher-capacity modulation scheme is used to convey information when noise and interference levels are relatively low. For example, Enhanced Data rates for GSM Evolution (EDGE) based systems utilize a modulation scheme such as 8PSK (or possibly an even higher-order modulation scheme such as 16-QAM or 32-QAM) when noise and interference levels are sufficiently low. However, GMSK is used to convey information when noise and interference levels are high. EDGE-based systems transmit information at the same symbol rate regardless of modulation type, but 8PSK provides a 3× data density improvement over GMSK because 8PSK encodes three bits of information per symbol compared to one bit for GMSK.

The GMSK modulation transmits one bit per symbol interval. In a commonly used model for the GMSK signal in GSM/EDGE, the bit is modulated using +1 or −1 (or phases of 0 and 180 degrees), but the phase of the signal is progressively shifted by pi/2 for each symbol interval. In a similar fashion, the 8PSK modulation in GSM/EDGE uses one of eight phases (0, pi/4, pi/2, 3pi/4 and their negative counterparts) to encode three bits of information, while progressively applying a phase shift of 3pi/8 per symbol interval. The phase shift applied to each signal helps shape the signal characteristics to be more suitable for amplification purposes, whereas the different phase shifts applied to GMSK and 8PSK help in distinguishing the two signals for the purposes of blindly detecting the modulation used in a particular frame.

While 8PSK modulation provides increased data density, GMSK modulated signals are less susceptible to error in high noise and interference environments because the phase and amplitude difference representing adjacent symbols is greater for GMSK than for 8PSK or QAM. Thus, EDGE communication systems tend to transmit information over highly disadvantaged channels using GMSK while 8PSK or QAM is used for less disadvantaged channels.

Mobile terminals operating in an EDGE or similar environment are subject to noise and co-channel interference, i.e., interference arising from other communication channels in the same or different cell. EDGE-based systems conventionally employ a Single Antenna Interference Cancellation (SAIC) technique for suppressing co-channel interference when both the interfering signal and desired signal are modulated according to GMSK. However, in many instances, the interfering signal does not have the same modulations as the desired signal. SAIC is not effective at cancelling co-channel interference when the desired and interfering signals have different modulations. For example, SAIC is ineffective at suppressing an interfering GMSK-modulated signal when the desired signal is modulated according to 8PSK. Other interference suppression techniques account for modulation differences, but require a highly complex equalizer and calculation of pre-filter coefficients separate from channel response estimation.

SUMMARY

According to the methods and apparatus taught herein, a composite baseband signal includes a desired signal component modulated according to a first modulation scheme and an interfering signal component modulated according to a second modulation scheme. When received, the signal is rotated in accordance with the rotation of the modulation of the interfering signal. The resultant signal is filtered and, depending on the filter coefficients, either the real or imaginary part of the filtered signal is extracted to suppress the interfering signal. Symbol estimates are then determined from the filtered signal by using an equalizer that uses postulates for the desired symbols that account for the difference in rotation between the modulation of the desired signal and the modulation of the interfering signal.

According to one embodiment, information is recovered from the composite signal by applying a phase rotation associated with the second modulation scheme to the composite signal to generate a rotated signal. Based on the rotated signal, a channel model associated with the desired signal component and interference cancelling filter coefficients associated with the interfering signal component are generated. The rotated signal is filtered according to the interference cancelling filter coefficients to suppress the interfering signal component from the rotated signal. The filtered signal is equalized based on branch metrics derived from the channel model and symbol hypotheses rotated in accordance with a difference in phase rotations associated with the first and second modulations to recover information from the desired signal component.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
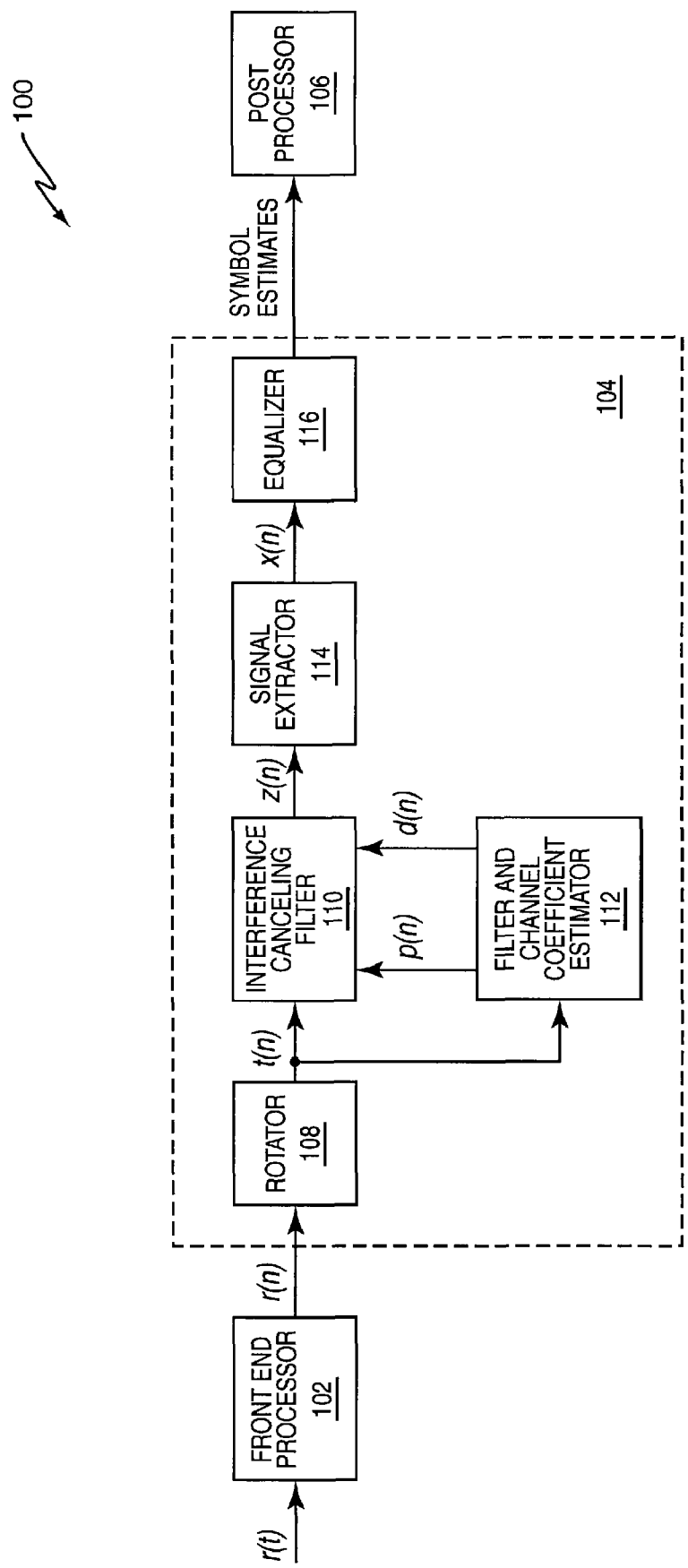
FIG. 1 is a block diagram of an embodiment of a wireless terminal that suppresses interference based on the modulation scheme of the interfering signal.

FIG. 1 illustrates an embodiment of a wireless terminal 100 such as a mobile phone or wireless communications base station including a front end processor 102, baseband processor 104 and post processor 106. The front end processor 102 filters and down-converts a received composite signal r(t) to yield a composite baseband signal r(n). The composite baseband signal r(n) includes a desired signal component s(n) modulated according to a first modulation scheme and an interfering signal component i(n) modulated according to a second modulation scheme. In one embodiment, the desired signal component s(n) is modulated according to 8PSK and the interfering signal i(n) is modulated according to GMSK. In other embodiments, the desired signal component s(n) is modulated according to an even higher-capacity modulation scheme such as 16-QAM or 32-QAM. Regardless, the baseband processor 104 applies a rotation to the signal r(n) in accordance with the modulation of the interferer. The baseband processor 104 then filters the resultant signal to suppress the interference and determines symbol estimates from the filtered signal. The post processor 106 performs various signal processing operations on the symbol estimates, such as error correction decoding.

In more detail, the baseband processor 104 includes a signal rotator 108. The rotator 108 applies a phase rotation associated with the modulation scheme of the interfering signal component i(n) to the composite baseband signal r(n) to generate a rotated signal t(n), e.g., as illustrated by Step 200 of FIG. 2. When the desired signal component s(n) has 8PSK modulations and the interfering signal component i(n) has GMSK modulations, the composite baseband signal is given by:

$$r(n) = \left\{\sum_{k=0}^{L-1} h(k)s(n-k)\right\} e^{\frac{j3\pi n}{8}} + \left\{\sum_{k=0}^{L-1} g(k)i(n-k)\right\} e^{\frac{j\pi n}{2}} + w(n) \quad (1)$$

where h(k) represents the channel encountered by s(n), g(k) represents the channel encountered by i(n), and w(n) represents noise. Note that h(k) and g(k) include contributions from the radio channel and the transmit and receive filters used.

The rotator 108 applies a progressive phase rotation of $$e^{\frac{-j\pi n}{2}}$$

to the composite baseband signal when the interfering signal component i(n) has GMSK modulations. The rotator output t(n) is thus given by:

$$\begin{aligned} t(n) &= r(n)e^{\frac{-j\pi n}{2}} \quad (2) \\ &= \left\{\sum_{k=0}^{L-1} h(k)s(n-k)\right\} e^{\frac{j\pi n}{8}} + \sum_{k=0}^{L-1} g(k)i(n-k) + u(n) \\ &= \left\{\sum_{k=0}^{L-1} h(k)e^{\frac{-j\pi k}{8}} s(n-k)e^{\frac{-j\pi(n-k)}{8}}\right\} + \sum_{k=0}^{L-1} g(k)i(n-k) + u(n) \\ &= \sum_{k=0}^{L-1} \hat{h}(k)\hat{s}(n-k) + \sum_{k=0}^{L-1} g(k)i(n-k) + u(n) \end{aligned}$$

where:

$$\hat{h}(k) = h(k)e^{\frac{-j\pi k}{8}} \quad (3)$$

$$\hat{s}(n) = s(n)e^{\frac{-j\pi n}{8}} \quad (4)$$

Of course, a different phase rotation may be applied to the composite baseband signal when the interfering signal component i(n) has a modulation scheme other than GMSK. Regardless, the composite baseband signal r(n) is rotated such that the resulting signal t(n) has a first portion $$\sum_{k=0}^{L-1} \hat{h}(k)\hat{s}(n-k)$$

corresponding to the desired signal component s(n) and a second portion $$\sum_{k=0}^{L-1} g(k)i(n-k)$$

corresponding to the interfering signal component i(n). The second portion of the rotated signal consists of a real signal i(n) passed through a complex filter g(k). An aptly chosen complex interference cancelling filter 110 may be applied to the rotated baseband signal t(n) to project substantially all of the interference along the imaginary axis. Then, by taking the real part of the resultant signal z(n), suppression of the interfering signal component is achieved, e.g., as illustrated by Step 204 of FIG. 2. The filter output z(n) is given by:

$$z(n) = t(n) * p(n) \quad (5)$$

where p(n) represents the filter coefficients, * denotes the convolution operation, and the real part of z(n) ideally has no contribution from the interfering signal component i(n). In another embodiment, the receiver 100 selects the interference cancelling filter p(n) so that the interference is projected along the real axis instead of the imaginary axis. According to this embodiment, the imaginary part of the filter output is then taken for further processing instead of the real part.

Figure 2:
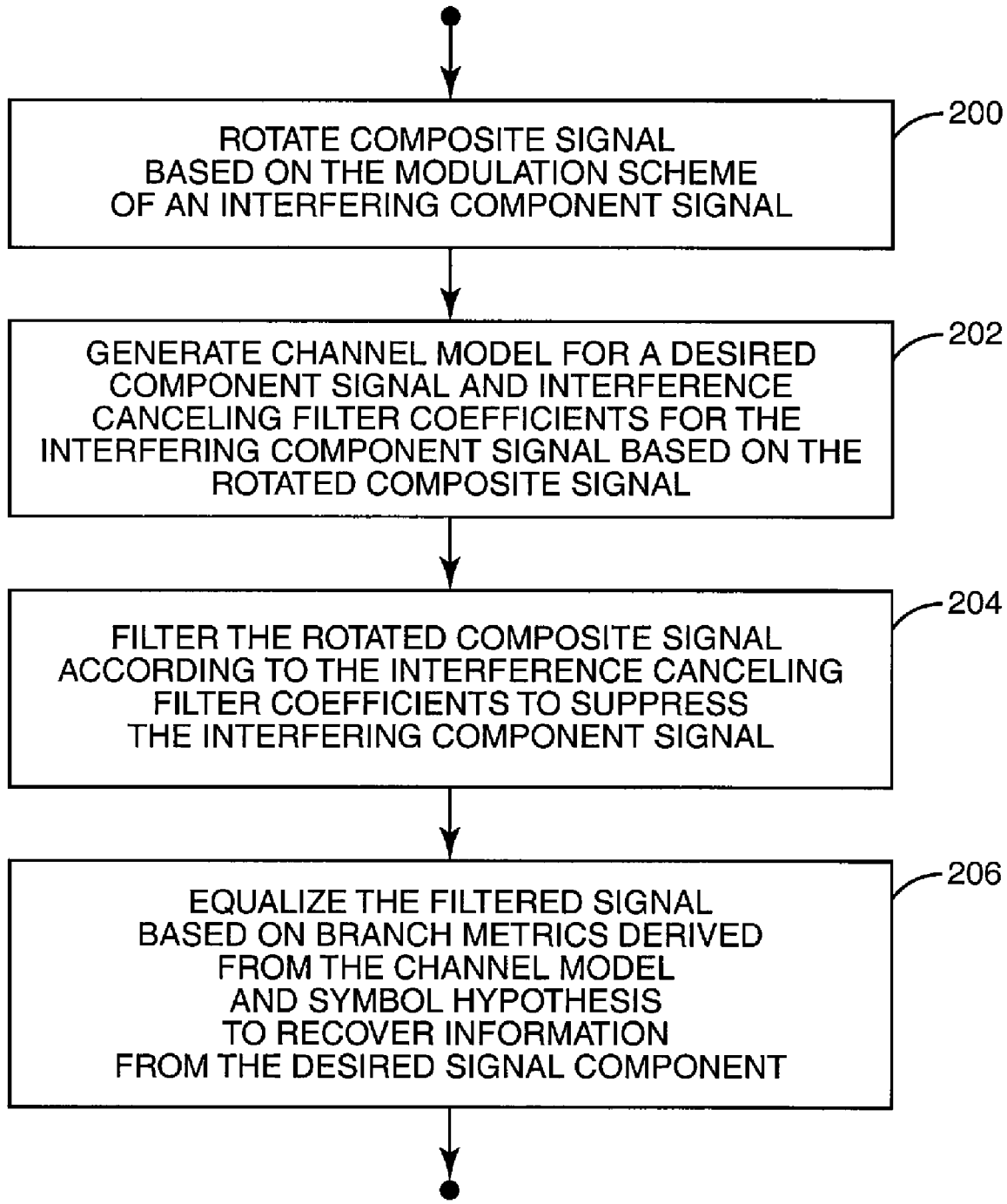
FIG. 2 illustrates an embodiment of processing logic for suppressing interference based on the modulation scheme of the interfering signal.
Figure 3:
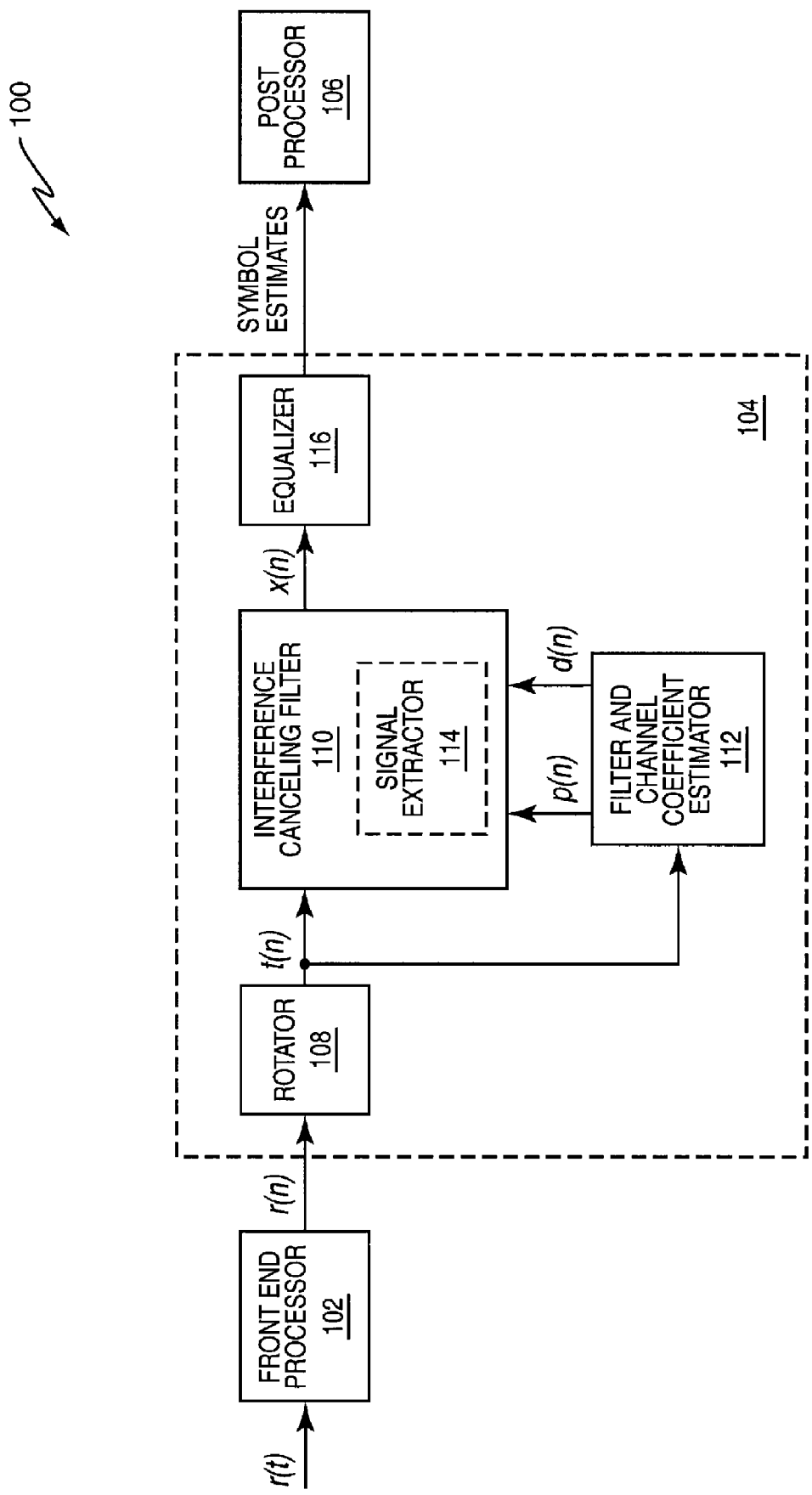
FIG. 3 is a block diagram of another embodiment of a wireless terminal that suppresses interference based on the modulation scheme of the interfering signal.

Either way, the filter coefficients p(n) along with a channel response estimate d(n) associated with the desired signal component s(n) are generated by a coefficient estimator 112, e.g., as illustrated by Step 202 of FIG. 2. Ideally, the filter coefficients p(n) and channel response d(n) are determined by taking either the real or imaginary part of the filter output z(n) using a signal extractor 114. For example, the signal extractor 114 takes the real part of z(n) when the interference is projected along the imaginary axis as given by:

$$\begin{aligned} x(n) &= \text{Re}\{p(n) * t(n)\} \quad (6) \\ &= \sum_{k=0}^{M-1} d_R(k)\text{Re}\{\hat{s}(n-k)\} - d_I(k)\text{Im}\{\hat{s}(n-k)\} + w_R(n) \end{aligned}$$

where x(n) is the extractor output, p(n) is complex, and $d_R(n)$ as well as $d_I(n)$ are real. Also, * denotes the convolution operation. The signal extractor 114 may be implemented separately from the interference cancelling filter 110 as shown in FIG. 1. In another embodiment, the signal extractor 114 is implemented as part of the filter 110 as shown by FIG. 3. Either way, the filter coefficients p(n) and channel response d(n) may be determined using known training sequences periodically transmitted to the wireless terminal 100.

In one embodiment, the training sequence information is used to jointly solve for the filter coefficients p(n) and the channel response coefficients $d_R(n)$ and $d_I(n)$, thus reducing receiver complexity. For EDGE-based systems, each received slot has a midamble of known symbols. The desired signal component s(n) is known over the midamble sequence and can be used to determine the best values of p(n), $d_R(n)$ and $d_I(n)$ as solutions that minimize the squared magnitude of the error e(n) as given by:

$$e(n) = x(n) - \sum_{k=0}^{M-1} d_R(k)\text{Re}\{\hat{s}(n-k-\tau)\} - d_I(k)\{\hat{s}(n-k-\tau)\} \quad (7)$$

The time delay parameter τ in equation (7) is an appropriately selected delay value that models the delay added by the interference cancelling filter 110 and can be determined as part of the optimization process given by equation (7). The optimization process given by equation (7) can be solved directly or indirectly using an adaptation algorithm such as the LMS or RLS algorithm.

Further, the number of taps in the resultant channel response d(n) can be chosen to optimize a subsequent equalization algorithm used to determine the values of the desired signal component s(n). Degenerate channel response values may be avoided by setting $d_R(0)$ to one. After the filter coefficients p(n) and channel response coefficients $d_R(n)$ and $d_I(n)$ are calculated, an equalization process is applied to the signal extractor output x(n) to determine the best estimate of the transmitted symbols associated with s(n).

In one embodiment, the equalization process is trellis-based. According to this embodiment, an equalizer 116 hypothesizes transmitted symbol values for the desired signal component s(n) to define states on a trellis. The equalizer 116 evaluates the trellis states using a squared error branch metric given by:

$$E(n) = \left| x(n) - \sum_{k=0}^{M-1} d_R(k)\text{Re}\{\hat{s}(n-k)\} - d_I(k)\text{Im}\{\hat{s}(n-k)\} \right|^2 \quad (8)$$

where x(n) is the signal extractor output when the interference is projected along the imaginary axis and M corresponds to the length of the modified channel response vector d(n), e.g., as illustrated by Step 206 of FIG. 2. Thus, the equalizer 116 hypothesizes un-rotated symbol values for s(n) to determine trellis states, but hypothesizes rotated symbol values ŝ(n−k) using the difference in rotation present in the modulation scheme for the desired signal and that applied by rotator 108 to determine the best estimate of the transmitted symbols, i.e., the best trellis states. For example, the rotated symbol hypothesis values ŝ(n−k) have the phase rotation given by equation (4) when the interfering signal component i(n) has GMSK modulations. This way, the phase rotation performed by the rotator 108 for projecting the interfering signal i(n) away from the desired signal s(n) is undone by the equalizer 116 during the symbol estimation process.

In one embodiment, the equalizer 116 is MLSE-based. In another embodiment, the equalizer 116 is DFSE-based. When the equalizer 116 is DFSE-based, the appropriate phase rotation, e.g., as indicated by equation (4) for GMSK interference and an 8PSK desired signal is applied to past decisions of the desired signal component s(n). Otherwise, the phase rotation performed by the rotator 108 is not undone during the symbol estimation process. Also, the modified channel response d(n) preferably has most of its energy concentrated in the first few taps when the equalizer 116 is DFSE-based. In one embodiment, this tap condition is accounted for when p(n), $d_R(n)$ and $d_I(n)$ are jointly calculated by the coefficient estimator 112 as given by equation (7).

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of recovering information from a composite signal including a desired signal component modulated according to a first modulation scheme and an interfering signal component modulated according to a second modulation scheme, the method comprising:
   applying a phase rotation associated with the second modulation scheme to the composite signal to generate a rotated signal;
   generating, based on the rotated signal, a channel model associated with the desired signal component and interference cancelling filter coefficients associated with the interfering signal component;
   filtering the rotated signal according to the interference cancelling filter coefficients to suppress the interfering signal component from the rotated signal;
   accumulating a squared error branch metric calculated based on the channel model, a current symbol hypothesis rotated in accordance with a difference in phase rotations associated with the first and second modulation schemes, and one or more past symbol hypotheses rotated in accordance with a difference in the phase rotations associated with the first and second modulation schemes; and
   estimating one or more transmitted symbols based on the accumulated squared error branch metric.

2. The method of claim 1, wherein generating the channel model and interference cancelling filter coefficients based on the rotated signal comprises jointly generating the channel model and interference cancelling filter coefficients based on the rotated signal.

3. The method of claim 2, wherein jointly generating the channel model and interference cancelling filter coefficients based on the rotated signal comprises generating a least-squares estimate of the channel model and interference cancelling filter coefficients based on training symbols in the rotated signal.

4. The method of claim 1, wherein equalizing the filtered signal based on the branch metrics comprises estimating one or more transmitted symbols based on the branch metrics.

5. The method of claim 1, wherein the first modulation scheme comprises a multi-dimensional modulation scheme and wherein the second modulation scheme comprises a one-dimensional modulation scheme.

6. The method of claim 5, wherein the first modulation scheme comprises an 8PSK modulation scheme, and wherein the second modulation scheme comprises a GMSK modulation scheme.

7. The method of claim 5, wherein the first modulation scheme comprises a $$\frac{3\pi}{8}$$

shifted 8PSK modulation scheme, and wherein the second modulation scheme comprises a GMSK modulation scheme.

8. The method of claim 5, wherein the first modulation scheme comprises a QAM modulation scheme, and wherein the second modulation scheme comprises a GMSK modulation scheme.

9. A receiver for recovering information from a composite signal including a desired signal component modulated according to a first modulation scheme and an interfering signal component modulated according to a second modulation scheme, the receiver comprising a baseband processor configured to:
- apply a phase rotation associated with the second modulation scheme to the composite signal to generate a rotated signal;
- generate, based on the rotated signal, a channel model associated with the desired signal component and interference cancelling filter coefficients associated with the interfering signal component;
- filter the rotated signal according to the interference cancelling filter coefficients to suppress the interfering signal component from the rotated signal;
- accumulate a squared error branch metric calculated based on the channel model, a current symbol hypothesis rotated in accordance with a difference in phase rotations associated with the first and second modulation schemes, and one or more past symbol hypotheses rotated in accordance with a difference in the phase rotations associated with the first and second modulation schemes; and
- estimate one or more transmitted symbols based on the accumulated squared error branch metric.

10. The receiver of claim 9, wherein the baseband processor is configured to jointly generate the channel model and interference cancelling filter coefficients based on the rotated signal.

11. The receiver of claim 10, wherein the baseband processor is configured to generate a least-squares estimate of the channel model and interference cancelling filter coefficients based on training symbols in the rotated signal.

12. The receiver of claim 9, wherein the baseband processor is configured to estimate one or more transmitted symbols based on the branch metrics.

13. The receiver of claim 9, wherein the first modulation scheme comprises a multi-dimensional modulation scheme and wherein the second modulation scheme comprises a one-dimensional modulation scheme.

14. The receiver of claim 13, wherein the first modulation scheme comprises an 8PSK modulation scheme, and wherein the second modulation scheme comprises a GMSK modulation scheme.

15. The receiver of claim 13, wherein the first modulation scheme comprises a $$\frac{3\pi}{8}$$

shifted 8PSK modulation scheme, and wherein the second modulation scheme comprises a GMSK modulation scheme.

16. The receiver of claim 13, wherein the first modulation scheme comprises a QAM modulation scheme, and wherein the second modulation scheme comprises a GMSK modulation scheme.

* * * * *